Patented Aug. 23, 1927.

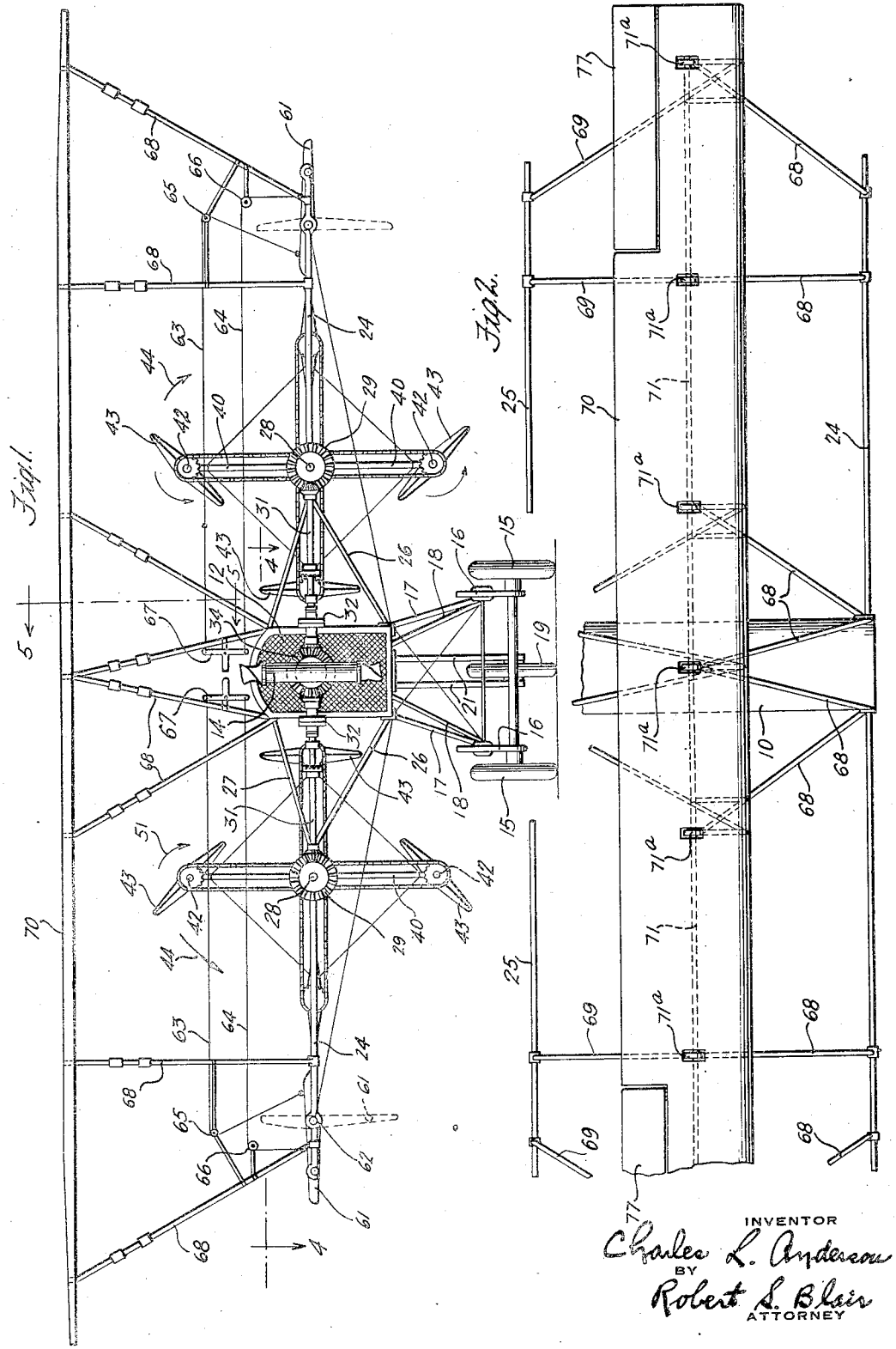

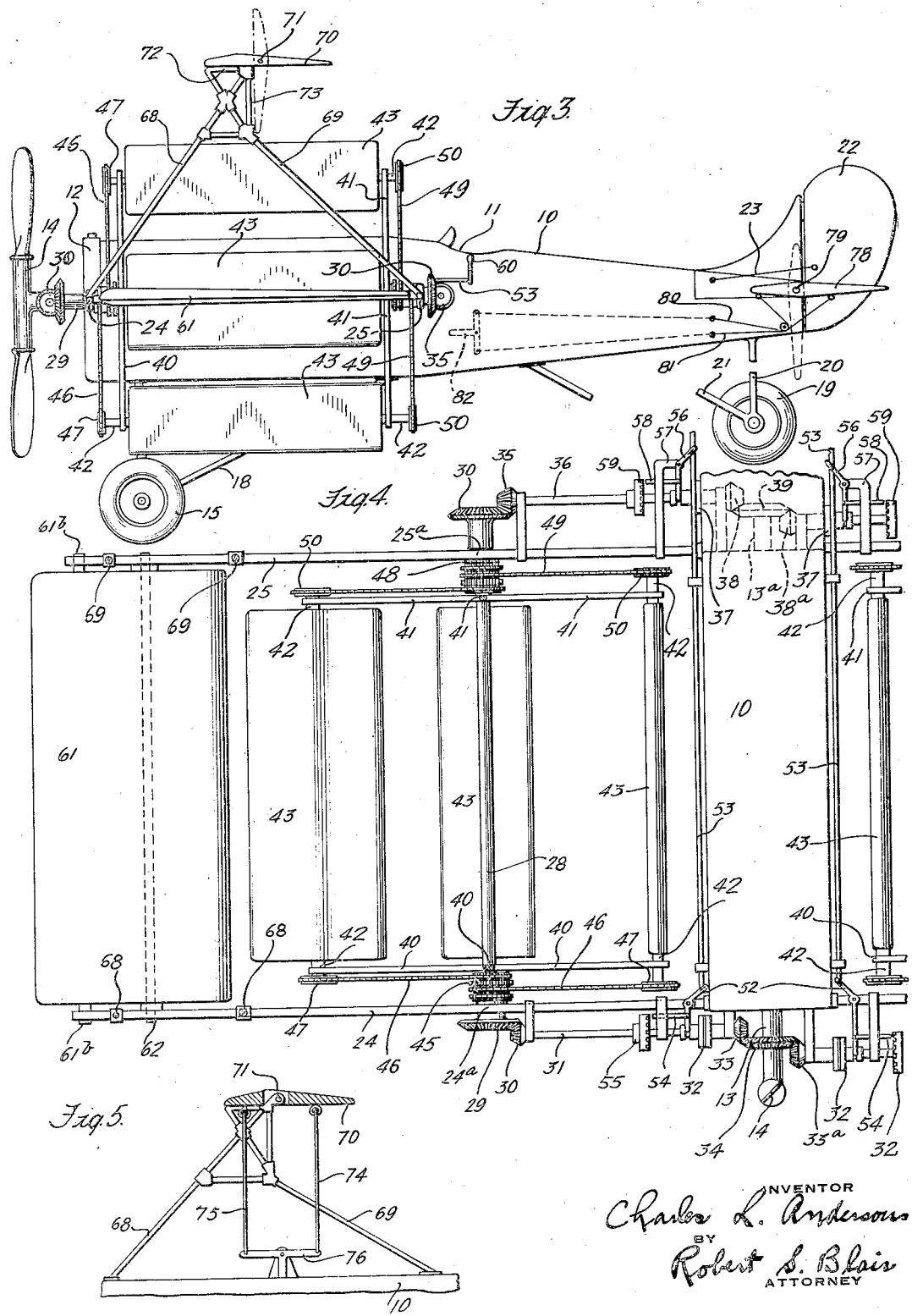

1,639,833

UNITED STATES PATENT OFFICE.

CHARLES L. ANDERSON, OF RENO, NEVADA.

AVIATION.

Application filed June 21, 1924. Serial No. 721,402.

This invention relates to aviation. One of the objects thereof is to provide an aerial machine of practical construction and efficient action, capable of meeting the requirements of practical use in a highly satisfactory manner. Another object is to provide a machine of the above nature simple in construction and adapted to operate dependably under all conditions. Another object is to provide an airplane construction wherein the space required for taking off and landing is reduced to a minimum. Another object is to provide such an airplane capable of convenient and dependable control during flying and during ascent and descent. Another object is to provide a practical and efficient art of aviation whereby flying is simplified and the hazards thereof reduced. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawings in which is shown one of the various possible embodiments of the mechanical structure of this invention, Figure 1 is a front elevation of an airplane.

Figure 2 is a plan view of the upper portion of the airplane, the lower portion thereof being omitted in order not to encumber the drawing.

Figure 3 is a side elevation.

Figure 4 is a section taken substantially along the line 4—4 of Figure 1, and

Figure 5 is a section taken substantially along the line 5—5 of Figure 1.

Similar reference characters refer to similar parts throughout the several views of the drawing.

Referring now to the drawing in detail, there is shown the fuselage 10 which may be of any desired type, and containing the operator's seat 11. In the forward portion of the fuselage 10, in advance of the driver's position 11, is located the motor, the radiator of which is indicated at 12, the drive shaft 13 projecting therethrough and connected to rotate the propeller 14. The landing gear may comprise, for example, a pair of forward wheels 15 connected through suitable shock absorbing devices 16 with struts 17 and 18 upon which the fuselage 10 is supported, and a tail support comprising a rear wheel 19 suspended from the rear portion of the fuselage 10 by suitable struts 20 and 21. Pivoted at the rear end of the fuselage 10 is a vertical controlling rudder 22 which is adapted to be operated in the usual manner through control wires 23 passing through the fuselage 10 to the operator's seat 11.

The parts thus far described are shown only somewhat diagrammatically, since they may be of usual construction and their details are unimportant as relating to the dominant features of this invention.

Projecting laterally from either side of the fuselage 10, as best shown in Figure 4, are a pair of parallel frame members 24 and 25 each of which is braced by a pair of frame braces 26 and 27, as shown in Figure 1. The construction about to be described is the same on both sides of the fuselage 10 so that that on one side only will be described in detail, similar reference characters being employed to indicate the similar parts on both sides. As shown in Figure 4, a transverse shaft 28 extends between the two frame members 24 and 25 having a bearing in each of the frame members at $24^a$ and $25^a$ respectively. This shaft 28 extends through the frame members 24 and 25, and at its ends are secured a pair of bevel gears 29 and 30 respectively. The gear 29 meshes with a gear 30 upon a shaft 31 which is connected through a clutch mechanism 32 in driving connection with a bevel gear 33. Mounted upon the drive shaft 13 of the motor is a double bevel gear 34 with one face of which the gear 33 coacts. The shaft 28 is thus adapted to be rotated in the direction indicated by the arrow through the clutch 32 from the drive shaft 13 of the airplane motor.

The gear 30 at the rear end of the shaft 28 meshes with a gear 35 upon a shaft 36 which is connected through a clutch mechanism 37 in driving relation with a bevel gear 38. A drive shaft $13^a$ projects from the rear of the airplane motor and mounted thereon is a double bevel gear 39 with one face of which the bevel gear 38 coacts. The two gears 34 and 39 thus, through the respective clutches 32 and 37 and shafts 31 and 36, in unison drive the shaft 28.

Rigidly connected to the shaft 28 adjacent its forward end are four radial arms 40 spaced at 90°, and adjacent the rear end of the shaft 28 are rigidly secured four similar and corresponding radial arms 41. In the ends of corresponding pairs of these arms 40 and 41, are rotatably supported shafts 42 which are parallel to the shaft 28 and each of which carries a wing or vane 43 rigidly mounted thereon. The arms 40 and 41, and hence the wings 43 carried thereby rotate with the shaft 28 about the axis of the shaft 28, as indicated by arrow 44 in Figure 1. Mounted upon the shaft 28 between the arms 40 and the frame member 24, is a hub 45 which comprises four sprockets with each of which coacts with one of four chains 46. These chains extend respectively to the four shafts 42 carrying the wings 43, and coact with sprockets 47 mounted upon the ends thereof. Mounted upon the shaft 28 between the arms 41 and the frame member 25 is a second hub 48 comprising four sprocket wheels, similar to the sprocket hub 45. Four driving chains 49 connect the four sprockets of this hub 48 with four sprockets 50 mounted upon the rear ends of the four shafts 42 carrying the wings 43. Thus as the wings 43 are rotated about the axis of the shaft 28, they are also rotated by the driving chains 46 and 49 about the axes of their respective shafts 42, as indicated by the arrow 51 in Figure 1.

The ratio of the sprockets 45 and 47 and of the sprockets 48 and 50 is such that the wings 43 are turned about their respective axes 180° during each rotation of the shaft 28. Furthermore, this connection is such that on the downward stroke of each wing 43 it is passing through its flat-wise position so that it forces air downwardly. This may best be realized by reference to Figure 1, wherein it will be seen that the wings 43, when in uppermost position, are substantially at an angle of 45° with respect to the horizontal, that when they are half through their downward stroke they are substantially horizontal, and in their lowermost position they are again at substantially 45° with respect to the horizontal, but tilted in the opposite direction from that in which they are tilted in their uppermost position. On their upward strokes the wings 43 cut the air substantially edgewise so that little resistance is offered during this portion of their rotation. These wings 43 therefore revolving about the axis of the shaft 28 and rotating about their individual axes, tend on their downward strokes to force air downwardly and thus lift the airplane.

Referring again to Figure 4, the double bevel gears 34 and 39 on the motor drive shaft, with one face of which the gears 33 and 38 respectively mesh, serve also to drive through gears 33ª and 38ª a lifting mechanism similar to that just described and similarly positioned upon the opposite side of the fuselage 10. As has been mentioned, the mechanisms on either side are substantially identical so that one only, as shown in detail, need be described in detail, similar reference numerals being applied to similar parts of both mechanisms in the figures of the drawings. It will be seen, however, that the wings 43 on the right-hand side of the fuselage, as viewed in Figure 1, revolve about their driving shaft 28 and about their individual axes 42 in a direction opposite to the revolution and rotation of the wings 43 on the left-hand side of the fuselage. Thus, on the downward stroke of the wings, the wings on both sides are moving away from the fuselage forcing the air downwardly in such direction as to afford the most advantageous lifting force. The two sets of wings 43 thus driven from the motor serve to lift the airplane in a vertical direction and their drive may be thrown in or cut out at will by manipulation of the clutches 32 and 37, as will be described. Referring again to Figure 4, connected to operate the clutch 32 is a lever 52 pivoted to the frame member 24 and connected with a rod 53 extending rearwardly along the fuselage 10. A forward movement of the rod 53, it will be seen, through the lever 52, moves the clutch 32 to the position of disengagement. Connected to the lever 52 is an arm 54 which is adapted upon such movement of the clutch to slide into locking engagement with a toothed collar 55 fixed upon the shaft 31. Thus, when the rod 53 is operated to disengage the clutch 32, the shaft 31 is at the same time locked against further rotation and the wings 43 connected in driving relation therewith are also locked against further rotation. Connected to operate the clutch 37 is a lever 56 which is pivoted upon an extension 57 from the frame member 25 and which is also connected to the slidable operating rod 53. A forward movement of the rod 53, through the lever 56, moves the clutch 37 to the position of disengagement and also an arm 58 into engagement with a toothed locking collar 59 secured upon the shaft 36. Thus by manipulation of the operating rod 53 the clutches 32 and 37 are thrown out of engagement and the wings 43 are locked against further rotation by the two locking collars 55 and 59. This clutch release and locking mechanism is substantially the same on each side of the fuselage 10 and similar reference characters are employed to indicate similar parts in both. The two slidable operating rods 53 may extend rearwardly to a position adjacent the driver's seat 11 as indicated in Figure 3 and be operated therefrom as by a suitable handle indicated at 60.

The propeller 14, as indicated, is of a well-known type in which the propeller blades are capable of adjustment as to pitch so that they may be set in neutral position, that is so that the propeller gives substantially no forward thrust, and the blades may be adjusted as desired to change their pitch and drive the airplane in a forward direction. The control for this adjustment of the propeller is not shown herein in order not to encumber the drawings and may be of a well-known type operated from the driver's position 11. Thus, the airplane motor may be started and run freely with the propeller 14 in neutral position and the clutches 32 and 37 thrown out of power transmitting relation, the wings 43 being locked against rotation. Thereupon the operator desiring to ascend may throw in the clutches 32 and 37 by means of the levers 60 and the airplane is lifted from the ground by the rapid revolution of the lifting wings 43. Having attained the desired elevation the operator may throw out the clutches 32 and 37, thereby locking the wings 43 against further movement and may thereupon change the pitch of the adjustable propeller 14 to start the propulsion of the airplane in a forward direction.

Referring again to Figure 1, there are mounted between the two frame members 24 and 25 on either side of the fuselage 10, and adjacent the outer ends of these frame members, a pair of wings 61. These two wings are substantially similar in construction and control so that one only need be described in detail, similar reference characters being employed in the drawings to denote similar parts of both. In Figure 4, the wing 61 on the left-hand side of the fuselage, as viewed in Figure 1, is seen to be mounted upon a rod 62 extending therethrough and having bearings at its ends in the respective frame members 24 and 25. The wing 61 is thus capable of adjustment about the axis of the rod 62. Its adjustment in a clockwise direction, as viewed in Figure 1, is limited by engagement of lugs 61$^b$ thereon with hooked ends of the frame members 24 and 25, in which position the wing 61 is in substantially a horizontal plane. The adjustment of the wing 61 may be controlled by suitable controlling means operated from the driver's position; for example, there is diagrammatically shown in the drawing a control comprising a pair of pull wires 63 and 64 connected to the wing 61 on opposite sides of the axis 62, passing over pulleys 65 and 66 respectively, and connected with a T-shaped operating lever 67. By swinging the lever 67 about its pivot, the wing 61 is swung about its axis 62 from the full line position shown in Figure 1 to the dotted line position, or in a reverse direction. The wing 61 on the right-hand side of the fuselage 10 is similarly controlled as will be understood by applying the above description to this mechanism.

Referring now more particularly to Figures 1 and 3, there is provided, extending upwardly from the fuselage 10 and from the lateral frame members 24 and 25, a suitable frame work comprising, for example, suitably braced forward frame members 68 and corresponding rear frame members 69. This frame work supports at its upper portion a top wing 70. This wing 70 is fixed upon a transverse shaft or rod 71, extending therethrough, which shaft is rotatably supported by the frame work, for example as indicated at the points 71$^a$, shown best in Figure 2. This wing 70 is thus capable of adjustment about the axis of the shaft 71 being adapted to swing from the full line position shown in Figure 3 to the dotted line position and back again, its swinging being limited by engagement with the frame members 72 and 73, as indicated in this figure. In the full line position against the frame member 72 the wing 70 is substantially in normal flying position, its forward end being slightly tilted up.

Suitable controlling means is provided for controlling the adjustment of the wing 70 from the driver's position 11. This controlling means may take the form, for example, as shown in Figure 5 of pull wires 74 and 75, one connected to the wing 70 on either side of the axis 71 and extending to a suitable control lever 76 within reach of the operator.

As shown in Figure 2, the wing 71 is provided with suitable ailerons 77 by means of which the flight of the airplane may be controlled in the usual manner when the wing 70 is in normal flying position. The controls for these ailerons 77 are not shown since they may be of the usual form operated from the driver's seat in conjunction with the tail rudder 22.

Referring again to Figure 3, there is provided at the rear end of the fuselage 10 the usual elevation control plane 78 fixed upon a pivotally supported transverse shaft 79. The elevator 78 is thus capable of adjustment about its axis 79 and may be adjusted by means of control wires such as 80 and 81 to any desired angle or to the vertical position indicated in dotted lines. The control wires 80 and 81 may, for example, pass through the fuselage 10, as shown, and be operated by a suitable operating lever 82 positioned within reach of the driver of the airplane.

In the operation of this machine, the motor is first started with the propeller 14 adjusted to give substantially no forward thrust and with the clutches 32 and 37 thrown to position of disengagement. The operator thereupon, by means of the controls 67, 76 and 82 adjusts the panels 61, the wing 70 and the elevator 78 to substantially vertical position as indicated by their respective dotted line positions in Figures 1 and 3. Then, by means of the levers 60, the clutches 32 and 37 are thrown in, starting the propulsion of the lifting wings 43 which act to vertically raise the machine into the air, the center of mass of the machine being properly positioned with respect to the lifting wings 43. During such ascension the panels 61, the wing 70 and the elevating plane 78 may be operated through their controls if desired to control the upward movement of the machine. Having reached the desired altitude, the operator throws out the clutches 32 and 37 locking the lifting wings 43 against further revolution, adjusts the panels 61, the wing 70 and the elevator 78 to normal flying position, and then adjusts the vanes of the propeller 14 to start the propulsion of the machine in a forward direction. It will be understood that the controls for these adjustments may, if desired, be constructed to operate in unison so that the adjustments are accomplished substantially simultaneously, the controls shown herein being only diagrammatically represented.

Elevation having been attained and the forward propulsion of the machine started, as above described, the flying of the airplane may be controlled in the usual manner by means of the ailerons 77, the tail rudder 22 and the elevating plane 78. The panels 61 and the wing 70 are designed to afford sufficient lifting surface to support the airplane in ordinary flying. When it is desired to descend the drive of the propeller 14 may again be interrupted, and the forward momentum of the machine having decreased, the clutches 32 and 37 may be thrown in to actuate the revolving wings 43, the speed of revolution of which by control of the speed of the motor may be so controlled that the wings permit a gradual descent of the machine. During such descent the panels 61, the wing 70 and the elevator 78 may be turned to control the direction of the downward movement of the airplane.

From the above it will be seen that there are herein provided an art of aviation and a machine therefor which attain practical advantages of great importance. The space required for ascending and descending is reduced to a minimum and the hazards of a rapid taking off or landing are done away with. Furthermore, these advantages are attained without sacrifice of the practicability and operativeness of the machine for flying.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. In an aerial machine, in combination, an airplane body, a motor mounted adjacent the forward end thereof, lateral frame members extending outwardly from said body adjacent said motor, a horizontal shaft rotatably mounted in said frame members, a plurality of wings spaced about said shaft and connected therewith to revolve therewith about the axis of said shaft, said wings being rotatably mounted about individual axes substantially parallel to the axis of said shaft, driving means connecting said shaft and said wings adapted during rotation of said shaft and revolution of said wings thereabout to rotate said wings about their individual axes so that upon downward movement they cut the air substantially flatwise tending to lift the airplane and so that upon upward movement they cut the air substantially edgewise, a driving shaft extending outwardly from said body along said frame members having adjacent its outer end a driving connection with said transverse shaft and at its inner end a clutch connection with the drive shaft of said motor, means for operating said clutch to control the drive of said horizontal shaft and said wings, and means adapted upon disengagement of said clutch to lock said outwardly extending driving shaft and said wings against further rotation.

2. In an aerial machine, in combination, an airplane body, a motor mounted adjacent the forward end thereof, lateral frame members extending outwardly from said body adjacent said motor, a horizontal shaft rotatably mounted in said frame members, a plurality of wings spaced about said shaft and connected therewith to revolve therewith about the axis of said shaft, said wings being rotatably mounted about individual axes substantially parallel to the axis of said shaft, driving means connecting said shaft and said wings adapted during rotation of said shaft and revolution of said wings thereabout to rotate said wings about their individual axes so that upon downward movement they cut the air substantially flatwise tending to lift the airplane and so that upon upward movement they cut the air substantially edgewise, a pair of driving shafts extending outwardly from said body along said frame members having adjacent their outer ends driving connections with said horizontal shaft and at their inner ends clutch connections with the drive shaft of said motor, and means for jointly operating said clutches to control the drive of said horizontal shaft and of said wings, and means adapted upon disengagement of said clutches to lock said wings against further movement.

3. In an aerial machine, in combination, an airplane body, a motor mounted adjacent the forward end thereof, lateral frame members extending outwardly from said body adjacent said motor, a horizontal shaft rotatably mounted in said frame members, a plurality of wings spaced about said shaft and connected therewith to revolve therewith about the axis of said shaft, said wings being rotatably mounted about individual axes substantially parallel to the axis of said shaft, driving means connecting said shaft and said wings adapted during rotation of said shaft and revolution of said wings thereabout to rotate said wings about their individual axes so that upon downward movement they cut the air substantially flatwise tending to lift the airplane and so that upon upward movement they cut the air substantially edgewise, a driving shaft extending outwardly from said body along said frame members having adjacent its outer end a driving connection with said horizontal shaft and at its inner end a clutch connection with the forward end of the drive shaft of said motor, a second driving shaft extending outwardly from said body along said frame members having adjacent its outer end a driving connection with said horizontal shaft and at its inner end a clutch connection with the rear end of the drive shaft of said motor, and means for jointly operating said two clutches to control the drive of said horizontal shaft and said wings.

4. In an aerial machine, in combination, an airplane body, a motor mounted adjacent the forward end thereof, a propeller adapted to be driven by said motor to propel said airplane in a forward direction, lateral frame members extending outwardly from said body adjacent said motor, supporting wings at the outer end portions of said frame members, means supported by said frame members between said body and said wings adapted to propel said airplane in an upward direction, means for adjusting said supporting wings substantially from a horizontal plane to a vertical plane to guide the airplane in its upward flight, and an elongated supporting wing extending transversely of said body above said upward propelling means and above said first supporting wings for supporting said airplane in forward flight.

5. In an aerial machine, in combination, an airplane body, a motor mounted adjacent the forward end thereof, a propeller driven from said motor adapted to propel said airplane in a forward direction, lateral frame members extending outwardly from said body adjacent said motor, supporting wings adjacent the outer ends of said frame members, means driven from said motor and supported by said frame members between said body and said supporting wings adapted to propel said airplane in an upward direction, means for rendering independently operative or inoperative said propeller and said upwardly propelling means, means adapted when said upwardly propelling means is rendered inoperative to lock the same against further movement, and means for adjusting said supporting wings substantially from a horizontal plane to a vertical plane to guide said airplane in its upward flight.

6. In an aerial machine, in combination, an airplane body, a motor mounted adjacent the forward end thereof, lateral frame members extending outwardly from said body adjacent said motor, a horizontal shaft rotatably mounted in said frame members, a plurality of wings spaced about said shaft and connected therewith to revolve therewith about the axis of said shaft, said wings being rotatably mounted about individual axes substantially parallel to the axis of said shaft, driving means connecting said shaft and said wings adapted during rotation of said shaft and revolution of said wings thereabout to rotate said wings about their individual axes so that upon downward movement they cut the air substantially flatwise tending to lift the airplane and so that upon upward movement they cut the air substantially edgewise, means for driving said horizontal shaft from said motor, a propeller driven from said motor adapted to propel said airplane in a forward direction, supporting wings positioned at the outer ends of said lateral frame members exterior of said rotating wings, means for independently rendering effective said drive of said horizontal shaft and said drive of said propeller, and means for adjusting said supporting wings substantially from a horizontal plane to a vertical plane.

7. In an aerial machine, in combination, an elongated airplane body, a motor mounted adjacent the forward end thereof, a propeller driven from said motor adapted to propel said airplane in a forward direction, a supporting wing extending transversely of said body and spaced above the same adjacent the forward end thereof, and reaching to a substantial distance on either side thereof, frame members extending laterally from said body adjacent said motor, means supported by said frame members beneath said supporting wing adapted to be driven from said motor to propel said airplane in an upward direction, and means for adjusting said entire supporting wing about an axis extending transversely of said body substantially from a horizontal plane to a vertical plane to facilitate upward flight of said airplane, and additional means for guiding said airplane in its upward flight.

8. In an aerial machine, in combination, an elongated airplane body, a motor supported adjacent the forward end thereof, a propeller driven from said motor adapted to propel said airplane in a forward direction, a supporting wing extending transversely of said body and spaced above the same adjacent said motor, and reaching to a substantial distance on either side thereof, said supporting wing being throughout its entire length supported upon a horizontal axis extending substantially through the center thereof transversely of said body, frame members extending laterally from said body adjacent said motor, means supported by said frame members beneath said supporting wing adapted to be driven from said motor to propel said airplane in an upward direction, means for rendering independently operative the drive of said propeller and the drive of said upwardly propelling means, and means for adjusting the position of said supporting wing about its axis substantially from a horizontal plane to a vertical plane to facilitate the upward flight of the airplane.

9. In an aerial machine, in combination, an airplane body, a motor mounted adjacent the forward end thereof, a propeller driven from said motor adapted to propel said airplane in a forward direction, a supporting wing extending transversely of said body adjacent the forward end thereof and spaced upwardly therefrom, frame members extending laterally from said body adjacent said motor, supporting wings adjacent the outer ends of said frame members, and beneath said first supporting wing, means supported by said frame members between said body and said last supporting wings adapted to be driven from said motor to propel said airplane in an upward direction, means for independently rendering effective the drive of said propeller and said upwardly propelling means, and means for adjusting said first supporting wing and said last supporting wings substantially from a horizontal plane to a vertical plane.

10. In an aerial machine, in combination, an airplane body, a motor mounted adjacent the forward end thereof, a propeller adapted to be driven from said motor to propel said airplane in a forward direction, lateral frame members extending outwardly from said body adjacent said motor, a horizontal shaft rotatably mounted in said frame members, a plurality of wings spaced about said shaft and connected therewith to revolve therewith about the axis of said shaft, said wings being rotatably mounted about individual axes substantially parallel to the axis of said shaft, driving means connecting said shaft and said wings adapted during rotation of said shaft and revolution of said wings thereabout to rotate said wings about their individual axes so that upon downward movement they cut the air substantially flatwise to lift the airplane and so that upon upward movement they cut the air substantially edgewise, a driving shaft extending outwardly from said body along said frame members having adjacent its outer end a driving connection with said transverse shaft and at its inner end a clutch connection with the drive shaft of said motor, means for operating said clutch to render the drive of said wings operative or inoperative, means adapted upon disengagement of said clutch to lock said wings against further rotation, a supporting wing extending transversely of said body and spaced upwardly above said rotating wings, means for adjusting the position of said supporting wing substantially from a horizontal position to a vertical position to facilitate upward movement of said airplane, a supporting wing mounted in said frame members beneath said first wing and exterior of said rotating wings, and means for adjusting said last wing substantially from a horizontal plane to a vertical plane for guiding said airplane in its upward movement.

In testimony whereof, I have signed my name to this specification this 29th day of May, 1924.

CHARLES L. ANDERSON.